United States Patent
Choi et al.

(10) Patent No.: US 9,958,599 B2
(45) Date of Patent: May 1, 2018

(54) DISPLAY DEVICE

(71) Applicant: Samsung Display Co., Ltd., Yongin-Si, Gyeonggi-Do (KR)

(72) Inventors: Jongchul Choi, Icheon-si (KR); Ju-hyun Shin, Hwaseong-si (KR); Myungjong Kim, Seoul (KR); Sung-dong Park, Asan-si (KR); Sanghwan Lee, Asan-si (KR); Jae-hwan Jeon, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 52 days.

(21) Appl. No.: 15/156,425

(22) Filed: May 17, 2016

(65) Prior Publication Data

US 2017/0097461 A1   Apr. 6, 2017

(30) Foreign Application Priority Data

Oct. 2, 2015  (KR) .................. 10-2015-0139212

(51) Int. Cl.
*F21V 8/00* (2006.01)

(52) U.S. Cl.
CPC ......... *G02B 6/0088* (2013.01); *G02B 6/0055* (2013.01); *G02B 6/0083* (2013.01)

(58) Field of Classification Search
CPC ............... G02B 6/0088; G02B 6/0055; G02F 1/133615; G02F 2001/133314; G02F 2001/133317; G02F 2001/133322

See application file for complete search history.

(56) References Cited

U.S. PATENT DOCUMENTS

| | | | |
|---|---|---|---|
| 6,867,827 B2* | 3/2005 | Cha ..................... | G02B 6/0071 349/58 |
| 2003/0169383 A1* | 9/2003 | Kim ..................... | G02B 6/0088 349/58 |
| 2005/0030443 A1* | 2/2005 | Nagahama .......... | G02B 6/0088 349/64 |
| 2008/0048200 A1 | 2/2008 | Mueller et al. | |
| 2012/0176786 A1 | 7/2012 | Presley et al. | |

(Continued)

FOREIGN PATENT DOCUMENTS

| KR | 1020080084350 A | 9/2008 |
|---|---|---|
| KR | 1020120075136 A | 7/2012 |

(Continued)

*Primary Examiner* — William N Harris
(74) *Attorney, Agent, or Firm* — Cantor Colburn LLP (57) ABSTRACT

A display device includes a display panel, a backlight unit, a bottom cover and a reflective member. The bottom cover defines a bottom portion thereof on which the backlight unit is supported. The bottom portion defines a plurality of edges thereof. The bottom portion is bent at a first edge thereof to define a first sidewall of the bottom cover, the first sidewall facing a light incident surface of a light guide plate. The first sidewall is bent to define a support portion of the bottom cover at the light incident surface of the light guide plate, the support portion extended to face the bottom portion and support the display panel thereon. The reflective member is coupled to the support portion, partially overlaps an emission surface of the light guide plate and has a same thickness as the support portion.

16 Claims, 9 Drawing Sheets

(56) References Cited

U.S. PATENT DOCUMENTS

| | | | | |
|---|---|---|---|---|
| 2013/0258702 A1* | 10/2013 | Kim | ................... | G02B 6/0091 |
| | | | | 362/602 |
| 2014/0002969 A1* | 1/2014 | Hwang | ................ | H05K 5/0017 |
| | | | | 361/679.01 |
| 2014/0063412 A1* | 3/2014 | Zhou | ................... | G02B 6/0088 |
| | | | | 349/65 |
| 2014/0321161 A1 | 10/2014 | Zhou | | |
| 2016/0021774 A1* | 1/2016 | Ha | .......................... | H05K 7/02 |
| | | | | 361/679.01 |
| 2016/0187557 A1* | 6/2016 | Zhang | ................... | G02B 6/009 |
| | | | | 362/606 |
| 2017/0097461 A1 | 4/2017 | Choi et al. | | |

FOREIGN PATENT DOCUMENTS

| | | |
|---|---|---|
| KR | 10-1320893 B1 | 10/2013 |
| KR | 10-1395572 B1 | 5/2014 |
| KR | 1020170040437 A | 4/2017 |

\* cited by examiner

DISPLAY DEVICE

This application claims priority to Korean Patent Application No. 10-2015-0139212, filed on Oct. 2, 2015, and all the benefits accruing therefrom under 35 U.S.C. § 119, the content of which in its entirety is are hereby incorporated by reference.

BACKGROUND (1) Field

The invention relates to a display device, and more particularly, to a slim display device.

(2) Description of the Related Art

Display devices are classified into a transmissive type, a transflective type or a reflective type. Each of the transmissive type display device and the transflective type display device includes a display panel, a backlight unit, a mold frame, a bottom cover and a top cover.

The backlight unit includes a light source generating light and a light guide plate guiding the received light toward the display panel.

SUMMARY

One or more exemplary embodiment of the invention provides a display device for which an overall thickness is decreased and an optical efficiency is increased.

An exemplary embodiment of the invention provides a display device including a display panel, a backlight unit, a bottom cover and a reflective member. The backlight unit is disposed below the display panel and generates and provides light to the display panel, the backlight unit including a light guide plate and a light source. The light guide plate defines an emission surface thereof through which the light is emitted, a reflective surface thereof facing the emission surface in a thickness direction thereof, and a plurality of side surfaces thereof which connect the emission surface to the reflective surface and define a light incident surface of the light guide plate. The light source generates and provides the light to the light incident surface of the light guide plates.

The bottom cover defines a bottom portion thereof on which the backlight unit is supported, the bottom portion defining a plurality of edges thereof. The bottom portion is bent at a first edge thereof to define a first sidewall of the bottom cover, the first sidewall facing the light incident surface. The first sidewall is bent to define a support portion of the bottom cover, the support portion extended to face the bottom portion and support the display panel thereon. The reflective member is coupled to the support portion, partially overlaps the emission surface, and has a same thickness as the support portion.

In an exemplary embodiment, the display device may further include a top cover which is coupled to the bottom cover and which exposes a display area of the display panel.

In an exemplary embodiment, the support portion may define a supporting surface thereof on which the display panel is supported, a facing surface thereof opposing the supporting surface in a thickness direction of the support portion, and side surfaces which connect the supporting surface to the facing surface. The reflective member may be coupled to and extended from at least one of the side surfaces of the support portion.

In an exemplary embodiment, the light source may include a printed circuit board and a plurality of light emitting elements which is mounted on the printed circuit board. The plurality of light emitting elements may be disposed between the first sidewall and the light incident surface.

In an exemplary embodiment, the printed circuit board may be disposed on the first sidewall and define a mounting surface thereof on which the plurality of light emitting elements is mounted, and emission surfaces of the plurality of light emitting elements may be parallel to the mounting surface of the printed circuit board.

In an exemplary embodiment, the printed circuit board may be extended between the light guide plate and the bottom portion and define a mounting surface thereof on which the plurality of light emitting elements is mounted, and emission surfaces of the plurality of light emitting elements may be perpendicular to the mounting surface of the printed circuit board.

In an exemplary embodiment, the reflective member may extend from the support portion of the bottom cover in a first direction. The support portion may define: first blocks thereof each of which has a first length in the first direction, and second blocks thereof each of which has a second length in the first direction that is less than the first length in the first direction. The first blocks and the second blocks may be alternately arranged in a second direction crossing the first direction.

In an exemplary embodiment, the reflective member may define: first reflective portions thereof corresponding to the first blocks and each of which has a third length, in the first direction, and second reflective portions thereof corresponding to the second blocks and each of which has a fourth length greater than the third length, in the first direction.

In an exemplary embodiment, the sum of the first length and the third length may be the same as that of the second length and the fourth length.

In an exemplary embodiment, the plurality of light emitting elements may respectively overlap the second reflective portions, respectively.

In an exemplary embodiment, the plurality of edges may include the first edge, a second edge facing the first edge, and third and fourth edges which respectively connect the first and second edges to each other, the third and fourth edges facing each other.

In an exemplary embodiment, the bottom portion of the bottom cover may be bent at the first, second, third and fourth edges thereof to respectively define the first sidewall, a second sidewall, a third sidewall and a fourth sidewall of the bottom cover.

In an exemplary embodiment, each of the second to fourth sidewalls may include a plurality of sub-sidewalls which is spaced apart from each other and each bent from a respective edge among the second to fourth edges of the bottom portion of the bottom cover.

In an exemplary embodiment, a plurality of openings respectively adjacent to the plurality of sub-sidewalls may be defined in the bottom portion. The display device may further include a mold frame which is coupled to the bottom cover and supports the display panel thereon. The mold frame may include first to third bodies corresponding to the second to fourth sidewalls, and a plurality of coupling protrusions respectively protruding from the first to third bodies and respectively extended into the plurality of openings to couple the first to third bodies to the bottom cover.

In an exemplary embodiment, each of the first to third bodies may define: an inner portion thereof extended facing an inner surface of the corresponding sidewall among the second to fourth sidewalls and from which the coupling protrusions protrude, an outer portion thereof extended facing an outer surface of the corresponding sidewall among the second to fourth sidewalls, and a connecting portion which connects the inner portion to the outer portion.

In an exemplary embodiment, the first to third bodies of the mold frame may provide a stepped portion which overlaps the display panel and supports the display panel thereon.

In an exemplary embodiment, the display device may further include a reflective sheet disposed between the bottom portion and the light guide plate.

In an exemplary embodiment, the display device may further include an optical sheet disposed between the display panel and the light guide plate.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Hereinafter, exemplary embodiments of the invention will be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. In the drawings, the dimensions of layers and regions are exaggerated for clarity of illustration. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 1:
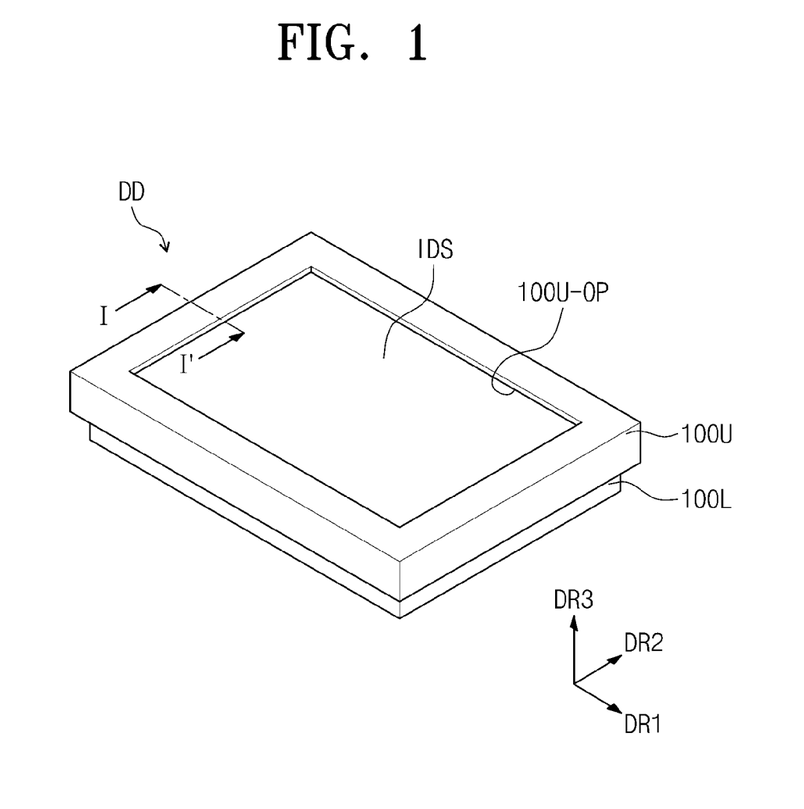
FIG. 1 is a perspective view of an exemplary embodiment of a display device according to the invention.
Figure 2:
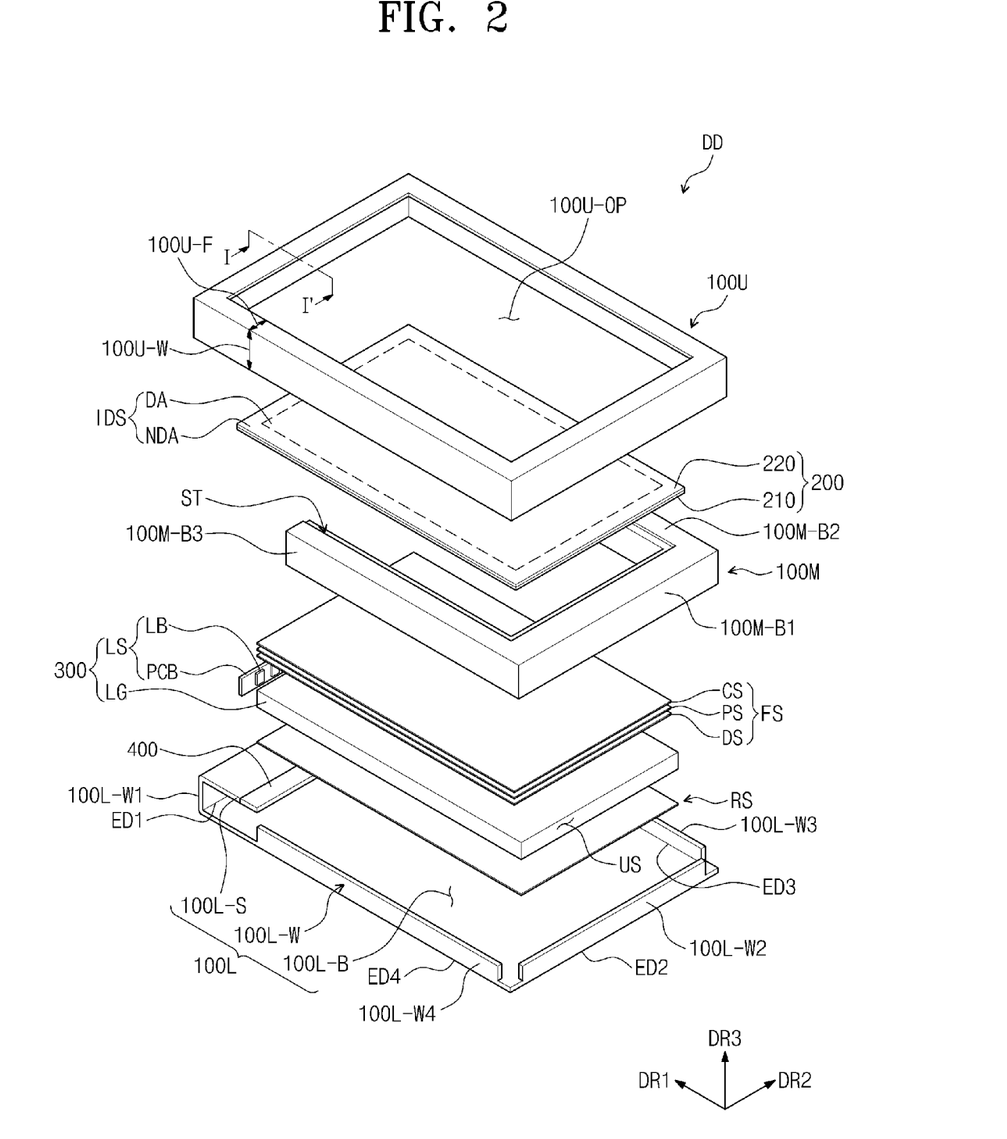
FIG. 2 is an exploded perspective view of the display device in FIG. 2 according to the invention.
Figure 3:
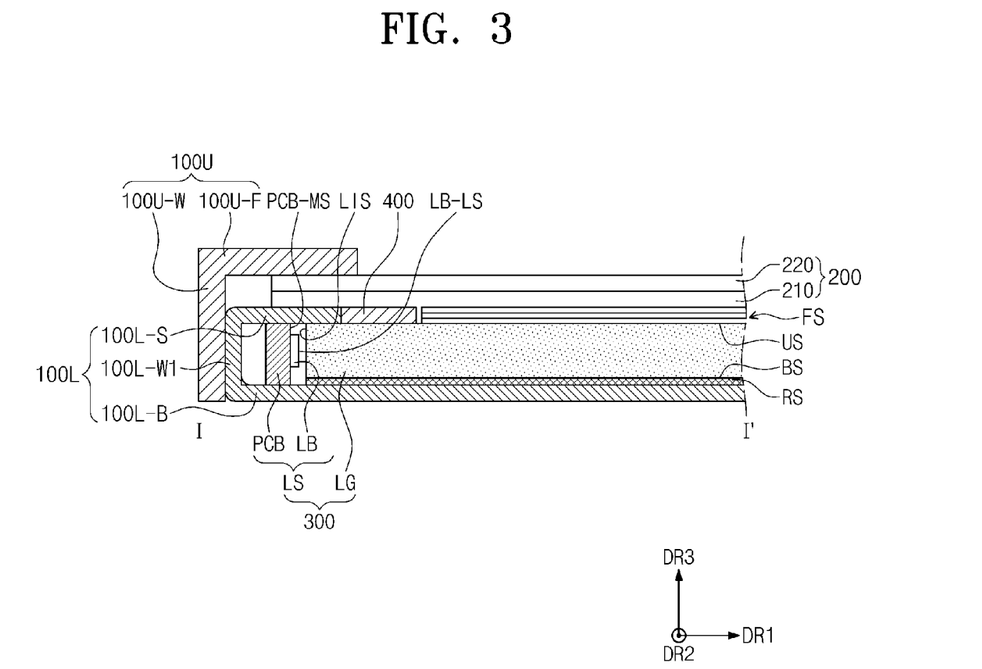
FIG. 3 is a partial cross-sectional view of the display device along line I-I' of FIGS. 1 and 2 according to the invention.
Figure 4A:
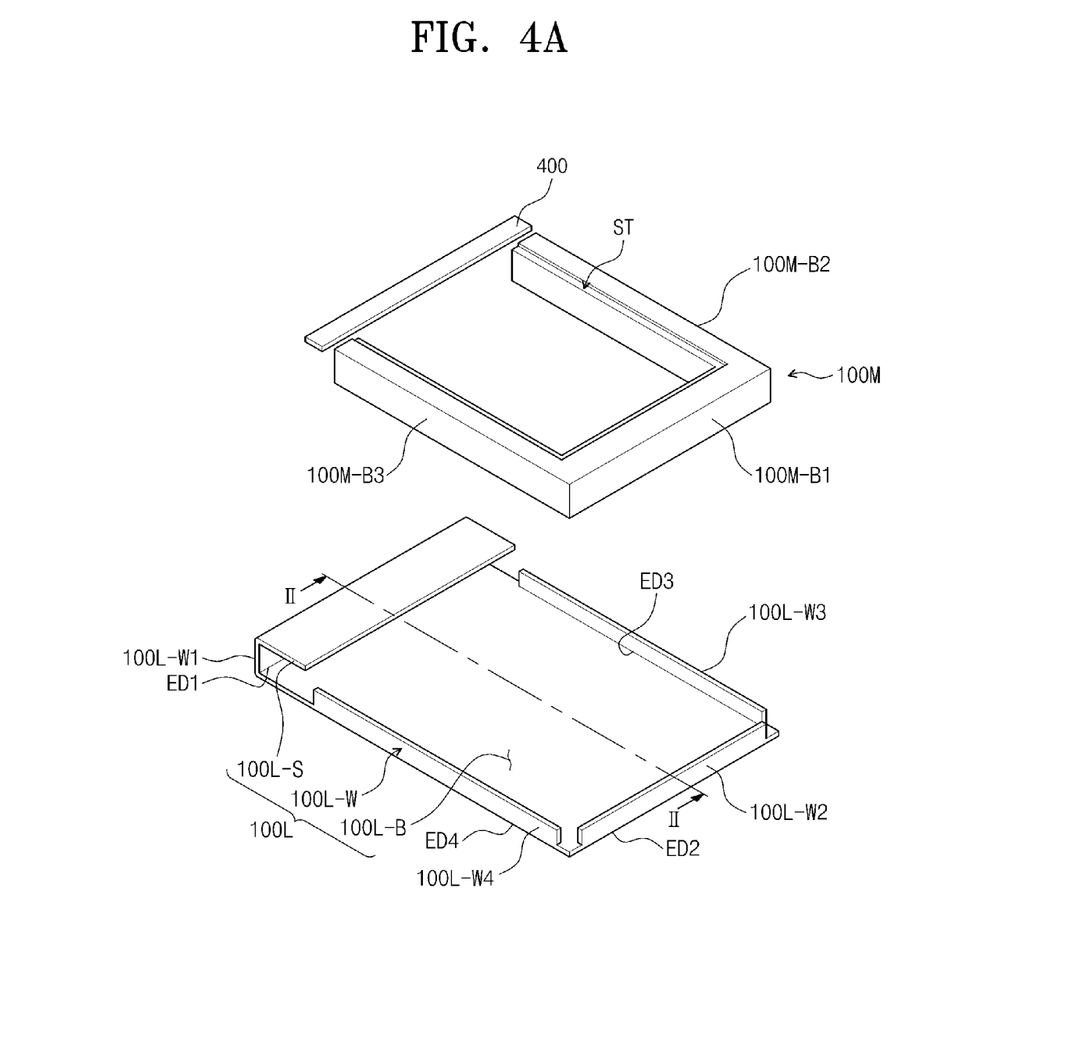
FIG. 4A is an exploded perspective view of an exemplary embodiment of a bottom cover, a reflective member and a mold frame of a display device according to the invention.
Figure 4B:
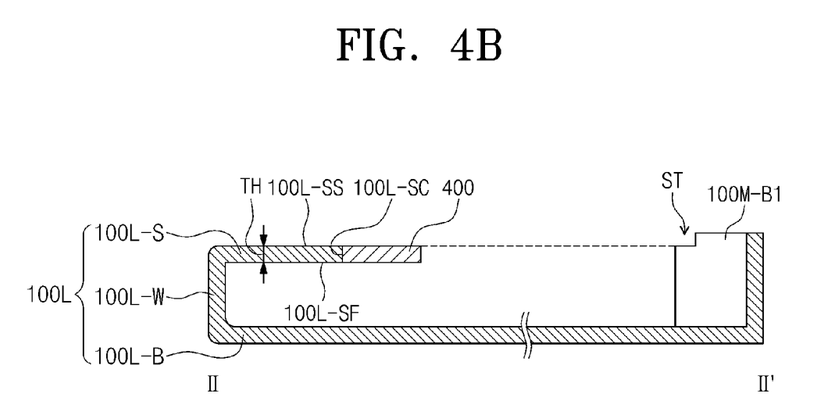
FIG. 4B is a cross-sectional view illustrating a coupled state of the bottom cover, the reflective member and the mold frame along line II-IF in FIG. 4A.

FIG. 1 is a perspective view of an exemplary embodiment of a display device DD according to the invention. FIG. 2 is an exploded perspective view of the display device DD in FIG. 1 according to the invention. FIG. 3 is a partial cross-sectional view of the display device DD according to the invention. FIG. 3 illustrates a cross-section taken along line I-I' of FIGS. 1 and 2. FIG. 4A is an exploded perspective view of an exemplary embodiment of a bottom cover 100L, a mold frame 100M and a reflective member 400 of a display device according to the invention. FIG. 4B is a cross-sectional view illustrating a coupled state of the bottom cover 100L, the mold frame 100M and the reflective member 400 in FIG. 4A. FIG. 4B is a cross-sectional view taken long line II-IF of FIG. 4A.

Although the exemplary embodiment of the display device DD that is applicable to a display monitor is illustrated in FIG. 1, the invention is not limited thereto. In exemplary embodiments, for example, the display device DD according to the invention may be applied to electronic devices such as a television, a notebook computer, a tablet personal computer ("PC"), and a game console, other than a display monitor. These are only exemplary embodiments, and the display device DD may be applicable to other electronic devices consistent with the scope and spirit of the invention.

As illustrated in FIG. 1, the display device DD includes a display surface IDS defined by a first directional axis DR1 and a second directional axis DR2. A third directional axis DR3 indicates a direction normal to the display surface IDS. The third directional axis DR3 indicates a thickness direction of the display device DD as a reference axis for distinguishing front and rear surfaces of members within the display device DD. A direction indicated by each of the first to third directional axes DR1 to DR3, as a relative concept, may be converted into another direction. Hereinafter, the first to third directions are respectively indicated by the first to third directional axes DR1 to DR3 and given by the same reference symbols.

As illustrated in FIGS. 2 and 3, the display device DD includes protection members 100U, 100M and 100L, a display panel 200, a backlight unit 300, and a reflective member 400. The display device DD according to one or more exemplary embodiment is a transmissive type or transflective type display device, which uses light provided from the backlight unit 300 to generate an image.

The display panel 200 receives the light generated and provided from the backlight unit 300 and displays an image with the light. In an exemplary embodiment, for example, the display panel 200 may include a liquid crystal display panel, an electrophoretic display panel and an electrowetting display panel. According to an exemplary embodiment, the display panel 200 may include a first display substrate 210, a second display substrate 220, and a liquid crystal layer (not shown) disposed between the first display substrate 210 and the second display substrate 220.

The backlight unit 300 includes a light source LS generating light and a light guide plate LG guiding the light received from the light source LS toward the display panel 200. According to an exemplary embodiment, an edge type backlight unit 300 including the light guide plate LG disposed above the bottom cover 100L is illustrated as an example.

The light guide plate LG is disposed below the display panel 200. The light guide plate LG may be a rectangular plate. The light guide plate LG includes an emission surface US, a reflective surface BS, and a plurality of connecting surfaces (or side surfaces) connecting the emission surface US to the reflective surface BS. One of the connecting surfaces is defined as a light incident surface LIS.

The emission surface US is a surface from which light incident to the light incident surface LIS is output from the light guide plate LG. The emission surface US faces the display panel 200. The reflective surface BS is opposite to and faces the emission surface US in the third direction DR3.

The light source LS includes a printed circuit board PCB and a light emitting element LB provided in plural mounted on the printed circuit board PCB. Although not shown, the printed circuit board PCB includes at least one insulation layer and at least one circuit layer. The circuit layer includes wirings through which a voltage is provided to the plurality of light emitting elements LB.

The plurality of light emitting elements LB are disposed between a first sidewall 100L-W1 of the bottom cover 100L and the light incident surface LIS of the light guide plate LG. Each of the plurality of light emitting elements LB may be a light emitting diode package. The printed circuit board PCB is disposed on the first sidewall 100L-W1 and provides a mounting surface PCB-MS that is substantially in parallel to the first sidewall 100L-W1. The plurality of light emitting elements LB are mounted on the mounting surface PCB-MS and have an emission surface LB-LS that is substantially in parallel to the mounting surface PCB-MS.

The printed circuit board PCB may have a shape of a bar lengthwise extending in the second direction DR2. The plurality of light emitting elements LB may be arranged and spaced a predetermined distance in the second direction DR2.

The display device DD may include optical sheets FS as including multiple sheets DS, PS, and CS and a reflective sheet RS to improve efficiency of light provided to the display panel 200. The optical sheets FS (DS, PS, and CS) are disposed between the emission surface US of the light guide plate LG and the display panel 200.

The optical sheets FS may include a diffusion sheet DS, a prism sheet PS and a protection sheet CS. The diffusion sheet DS diffuses light outputted from the emission surface US of the light guide plate LG. The prism sheet PS collects the light outputted from the emission surface US of the light guide plate LG in a direction perpendicular to the display panel 200. The protection sheet CS protects the prism sheet PS.

The reflective sheet RS is disposed below the light guide plate LG. The reflective sheet RS reflects light leaked from the reflective surface BS of the light guide plate LG or the like to be reincident to the reflective surface BS of the light guide plate LG. According to an exemplary embodiment of the invention, at least one of the optical sheets DS, PS and CS and the reflective sheet RS may be omitted.

As illustrated in FIGS. 2 to 4B, the protection members 100U, 100M and 100L include a top cover 100U, the bottom cover 100L and the mold frame 100M. The top cover 100U and the bottom cover 100L are coupled to each other and constitute the overall appearance of the display device DD as outermost elements thereof. Other components of the display device DD are accommodated in a space defined by the top cover 100U and the bottom cover 100L.

The top cover 100U is disposed above the bottom cover 100L. The top cover 100U exposes a portion of the display surface IDS defined by the display panel 200 to outside the display device DD. An opening 100U-OP of the top cover 100U exposes an area of the display panel 200, e.g., a display area DA at which an image is displayed. The top cover 100U covers a non-display area NDA of the display surface IDS. In a top plan view of the display device DD, the non-display area NDA in which an image is not generated may surround the display area DA. However, the arrangement relationship between the non-display area NDA and the display area DA is not limited thereto.

The top cover 100U may be a rectangular frame in a plane defined by the first directional axis DR1 and the second directional axis DR2. The top cover 100U may include a sidewall 100U-W (hereinafter, refer to as a top sidewall) providing an outer surface of the display device DD and a front portion 100U-F extended bent from the top sidewall 100U-W to overlap the display panel 200. The front portion 100U-F may be extended to define portions thereof bent in a direction opposite to the third direction DR3 and these bent portions define the sidewall 100U-W of the top cover 100U.

Although the top cover 100U including the top sidewall 100U-W and the front portion 100U-F is illustrated as an example, the invention is not limited thereto. According to an exemplary embodiment of the invention, the top cover 100U may include only the first sidewall 100U-W without the front portion 100U-F. In addition, as long as the top cover 100U is configured to be assembled with the bottom cover 100L, the shape of the top cover 100U is not limited thereto. According to an exemplary embodiment of the invention, the top cover 100U may be omitted.

The bottom cover 100L is disposed below the display panel 200. The bottom cover 100L includes a bottom portion 100L-B and a sidewall 100L-W (hereinafter, refer to as a bottom portion sidewall) extended bent from edges ED1 to ED4 of the bottom portion 100L-B, and a support portion 100L-S. The rectangular shaped bottom portion 100L-B including the four edges ED1 to ED4 is illustrated as an example in FIG. 2.

The sidewall 100L-W of the bottom cover 100L includes first to fourth sidewalls 100L-W1 to 100L-W4 respectively connected to the first to fourth edges ED1 to ED4 of the bottom portion 100L-B. The first to fourth sidewalls 100L-W1 to 100L-W4 spaced apart from each other are illustrated as an example. The first sidewall 100L-W1 and the second sidewall 100L-W2 face each other in the first direction DR1, and the third sidewall 100L-W3 and the fourth sidewall 100L-W4 face each other in the second direction DR2.

The support portion 100L-S is extended bent from the first sidewall 100L-W1. The support portion 100L-S faces the bottom portion 100L-B and may be parallel with the bottom portion 100L-B. The bottom cover 100L of which a plurality of portions thereof are bent from a bottom portion 100L-B thereof may be manufactured by using a mold and a press. The bottom portion 100L-B may be extended to define portions thereof bent in the third direction DR3 and these bent portions define the sidewall 100L-W of the bottom cover 100L. Although the bottom cover 100L including the first to fourth sidewalls 100L-W1 to 100L-W4 is illustrated as an example, the bottom cover 100L may include only the first sidewall 100L-W1, and the second to fourth sidewalls 100L-W2 to 100L-W4 may be omitted. The second to fourth sidewalls 100L-W2 to 100L-W4 may be replaced by a mold frame 100M that will be described later.

The mold frame 100M is disposed between the top cover 100U and the bottom cover 100L. The mold frame 100M is disposed above the bottom portion 100L-B. The mold frame 100M may overlap a portion of the display panel 200 to support the portion the display panel 200 together with the support portion 100L-S of the bottom cover 100L. The mold frame 100M may include or define first to third bodies 100M-B1 to 100M-B3 corresponding to the second to fourth sidewalls 100L-W2 to 100L-W4. The first to third bodies 100M-B1 to 100M-B3 may be integrated with each other. The first body 100M-B1 disposed lengthwise in the second direction DR2 may be extended to define portions thereof lengthwise in the first direction DR1 and these portions may define the second and third bodies 100M-B2 and 100M-B3. The first to third bodies 100M-B1 to 100M-B3 may provide or define a stepped portion ST overlapping the display panel 200 and supporting the display panel 200 thereon.

According to an exemplary embodiment of the invention, the mold frame 100M may be omitted. The second to fourth sidewalls 100L-W2 to 100L-W4 of the bottom portion 100L-B may support portion the display panel 200 together with the support portion 100L-S such that the mold frame 100M may be omitted.

The reflective member 400 is coupled to the support portion 100L-S and partially overlaps the emission surface US of the light guide plate LG. The reflective member 400 extends from a distal end of the support portion 100L-S in the first direction DR1. The reflective member 400 may lengthwise extend in a same direction in which the first sidewall 100L-W1 lengthwise extends. The reflective member 400 allows leaked light of light incident to the light incident surface LIS to be re-incident to the light guide plate LG. Also, light, which is not incident to the light incident surface LIS of the light guide plate LG, of light generated from the plurality of light emitting elements LB is allowed to be incident to the light guide plate LG. Optical efficiency increases by the above-described function of the reflective member 400

The reflective member 400 may be a white elastic member. The reflective member 400 may include silicon.

The reflective member 400 may have substantially a same thickness TH as the support portion 100L-S. The support portion 100L-S includes a supporting surface 100L-SS on which the display panel 200 is supported, a facing surface 100L-SF opposite to the supporting surface 100L-SS in the third direction DR3, and side surfaces 100L-SC connecting the supporting surface 100L-SS to the facing surface 100L-SF to each other. The reflective member 400 is coupled to one of the side surfaces 100L-SC of the support portion 100L-S, such as the side surface 100L-SC at the distal end of the support portion 100L-S. Since the reflective member 400 has substantially the same thickness TH as the support portion 100L-S such as to be integrated with the bottom cover 100L, the display device DD has an overall slim profile. The reflective member 400 is disposed in a same plane as the support portion 100L-2 to reduce an overall thickness of the display device DD.

Figure 5A:
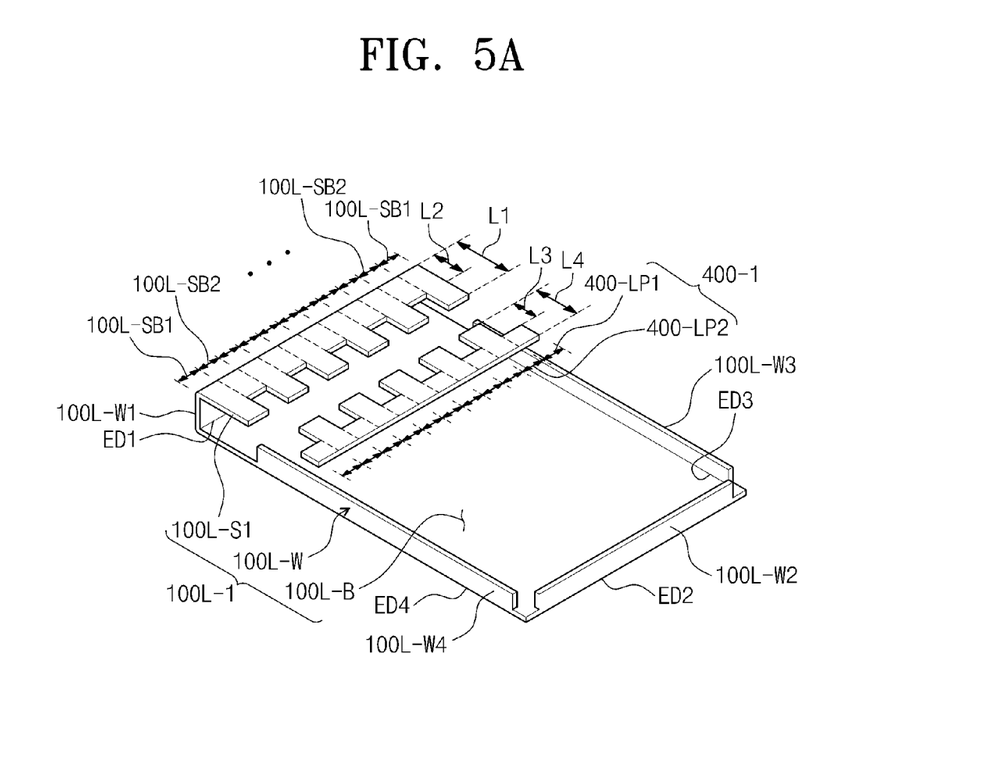
FIG. 5A is an exploded perspective view of another exemplary embodiment of a bottom cover and a reflective member of a display device according to the invention.
Figure 5B:
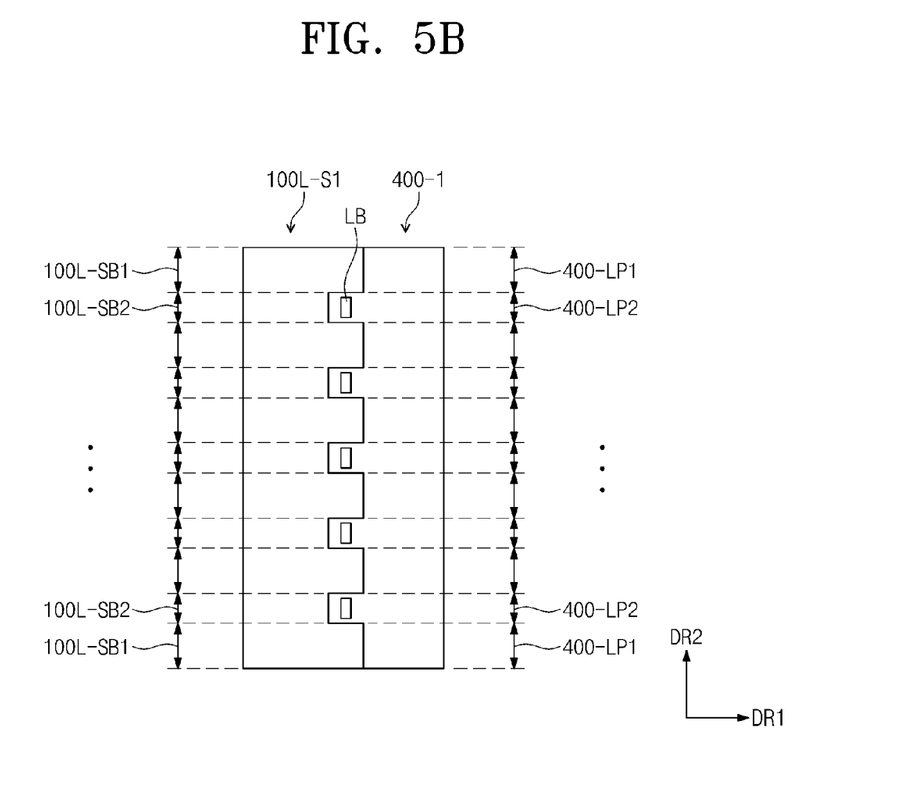
FIG. 5B is a top plan view illustrating a coupled state of the bottom cover and the reflective member in FIG. 5A according to the invention.

FIG. 5A is an exploded perspective view of an exemplary embodiment of a bottom cover 100L-1 and a reflective member 400-1 according to the invention. FIG. 5B is a top plan view illustrating a coupled state of the bottom cover 100L-1 and the reflective member 400-1 in FIG. 5A according to the invention.

As illustrated in FIGS. 5A and 5B, a support portion 100L-S1 of the bottom cover 100L-1 may have a length in the second direction DR2, which is divided into a plurality of portions. The support portion 100L-S1 includes first blocks 100L-SB1 and second blocks 100L-SB2. The first and second blocks 100L-SB1 and 100L-SB2 may collectively define a whole of the support portion 100L-S1. The support portion 100L-S1 including the six first blocks 100L-SB1 and the five second blocks 100L-SB2 is illustrated as an example.

Each of the first blocks 100L-SB1 has a first length L1 in the first direction DR1. Each of the second blocks 100L-SB2 has a second length L2 in the first direction DR1 that is less than the first length L1. Each of the first blocks 100L-SB1 may have a length in the second direction DR2, which is equal to or different from that of each of the second blocks 100L-SB2. The first blocks 100L-SB1 and the second blocks 100L-SB2 are alternately arranged in the second direction DR2.

The reflective member 400-1 may have a length in the second direction DR2, which is divided into a plurality of portions. The reflective member 400-1 may include first reflective portions 400-LP1 and second reflective portions 400-LP2. The first and second reflective portions 400LP-1 and 100LP-2 may collectively define a whole of the reflective member 400-1. The first reflective portions 400-LP1 respectively correspond to the first blocks 100L-SB1, and the second reflective portions 400-LP2 respectively correspond to the second blocks 100L-SB2. The first and second reflective portions 400LP-1 and 100LP-2 are alternately arranged in the second direction DR2. The first blocks 100L-SB1 of the bottom cover 100L-1 and the second reflective portions 400-LP2 of the reflective member 400-1 are engaged with each other to couple the bottom cover 100L-1 with the reflective member 400-1.

Each of the first reflective portions 400-LP1 has a third length L3 in the first direction DR1. Each of the second reflective portions 400-LP2 has a fourth length in the first direction DR1 L4 that is greater than the third length L3.

Each of the first reflective portions 400-LP1 may have a length in the second direction DR2, which is equal to that of each of the first blocks 100L-SB1. Each of the second reflective portions 400-LP2 may have a length in the second direction DR2, which is equal to that of each of the second blocks 100L-SB2.

The sum of the first length L1 and the third length L3 may be the same as that of the second length L2 and the fourth length L4. Since the support portion 100L-S1 and the reflective member 400-1 are engaged with each other, a coupling force between the support portion 100L-S1 and the reflective member 400-1 increases.

In an exemplary embodiment of manufacturing a display device, the bottom cover 100L-1 may be placed on a mold, and then, an injection mold may be coupled to only the support portion 100L-S1 of the bottom cover 100L-1, and resin may be injected into an injection space of the injection mold. When the resin is cooled, the reflective member 400-1 coupled to the support portion 100L-S1 may be formed. The reflective member 400-1 may be coupled to the support portion 100L-S1, especially to the distal end side surface (refer to 100L-SC in FIG. 4B) by using various methods in addition to the above-described injection molding.

As illustrated in FIG. 5B, the plurality of light emitting elements LB respectively overlap the second reflective portions 400-LP2 in the top plan view of the plane defined by the first and second directions DR1 and DR2. The second reflective portions 400-LP2 reflect light that is generated and provided from the plurality of light emitting elements LB or leaked from the light guide plate LG, to the light guide plate LG.

Figure 6A:
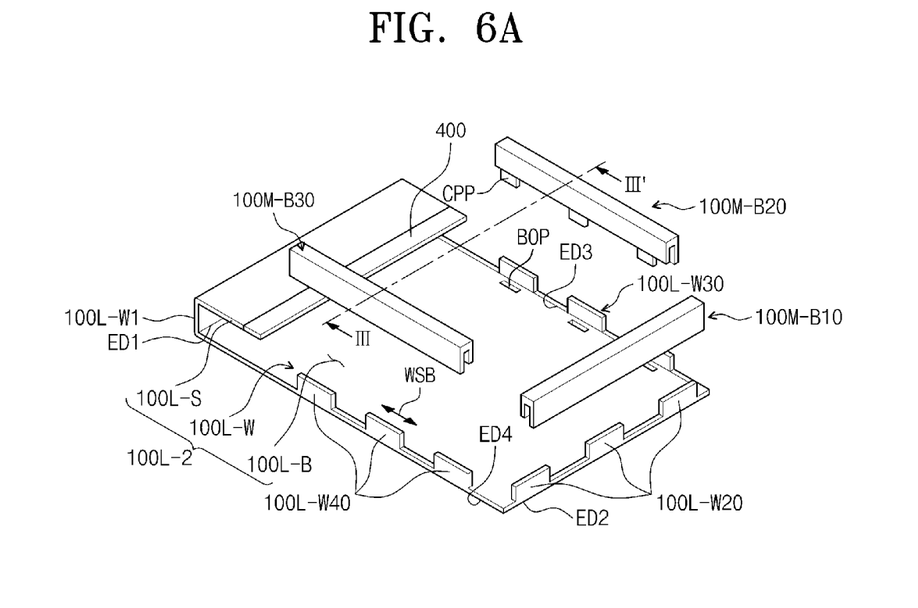
FIG. 6A is an exploded perspective view of another exemplary embodiment of a bottom cover and a mold frame of a display device according to the invention.
Figure 6B:
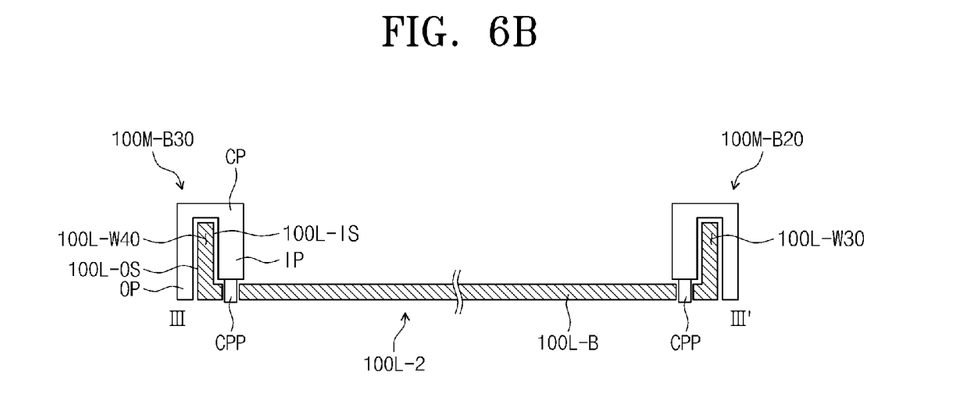
FIG. 6B is a cross-sectional view illustrating a coupled state of the bottom cover and the mold frame along line in FIG. 6A.

FIG. 6A is an exploded perspective view of an exemplary embodiment of a bottom cover 100L-2 and a mold frame according to the invention. FIG. 6B is a cross-sectional view illustrating a coupled state of the bottom cover 100L-2 and the mold frame in FIG. 6A according to the invention. FIG. 6B is a cross-sectional view taken long line of FIG. 6A.

As illustrated in FIGS. 6A and 6B, each of second to fourth sidewalls 100L-W20 to 100L-W40 of the bottom cover 100L includes or defines a plurality of sub sidewalls WSB that are spaced apart from each other. The sub sidewalls WSB within the second to fourth sidewalls 100L-W20 to 100L-W40 respectively define a whole of the second to fourth sidewalls 100L-W20 to 100L-W40. An opening BOP is provided in plural in the bottom portion 100L-B and adjacent to the plurality of sub sidewalls WSB.

The mold frame includes first to third bodies 100M-B10 to 100M-B30. First to third bodies 100M-B10 to 100M-B30 are disposed to respectively correspond to second to fourth edges ED2 to ED4 of the bottom portion 100L-B. In an assembled state with the bottom cover 100L-2, the first to third bodies 100M-B10 to 100M-B30 may be spaced apart from each other.

Each of the first to third bodies 100M-B10 to 100M-B30 is coupled to the corresponding sidewall among the second to fourth sidewalls 100L-W20 to 100L-W40. Each of the first to third bodies 100M-B10 to 100M-B30 includes an inner portion IP facing an inner surface 100L-IS of the second to fourth sidewalls 100L-W20 to 100L-W40, an outer portion OP facing an outer surface 100L-OS of the second to fourth sidewalls 100L-W20 to 100L-W40, and a connecting portion CP connecting the inner portion IP to the outer portion OP.

Also, the mold frame may further include or define coupling protrusions CPP that are respectively connected to the first to third bodies 100M-B10 to 100M-B30 and respectively coupled to the corresponding openings of the plurality of openings BOP. The coupling protrusions CPP are connected to and extended from the inner portions IP of the first to third bodies 100M-B10 to 100M-B30.

In an exemplary embodiment of manufacturing a display device, the bottom cover 100L-2 is placed on a mold, and then, injection molds are coupled to only the second to fourth sidewalls 100L-W20 to 100L-W40, and resin is injected into a injection space of each of the injection molds. When the resin is cooled, the first to third bodies 100M-B10 to 100M-B30 coupled to the second to fourth sidewalls 100L-W20 to 100L-W40 may be formed. The first to third bodies 100M-B10 to 100M-B30 coupled to the second to fourth sidewalls 100L-W20 to 100L-W40 may be formed by various methods in addition to the above-described injection molding.

Figure 7:
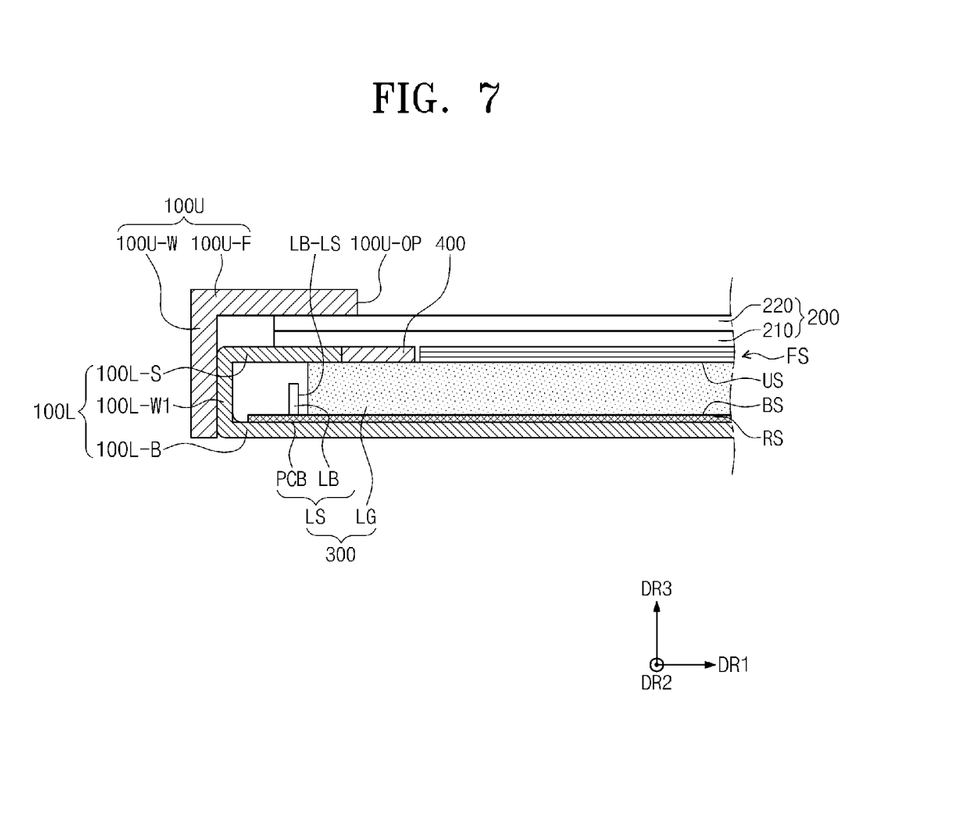
FIG. 7 is a partial cross-sectional view of another exemplary embodiment of a display device according to the invention.

FIG. 7 is a partial cross-sectional view of another exemplary embodiment of a display device according to the invention. FIG. 7 illustrates a cross-section corresponding to FIG. 3. The display device in FIG. 7 may be different from the display device DD in FIG. 3 only in arrangement of the light source LS.

The printed circuit board PCB is disposed below the light guide plate LG. The printed circuit board PCB may be bonded to a bottom portion 100L-B of the bottom cover 100L by using an adhesive agent. An emission surface LB-LS of a plurality of light emitting elements LB may be substantially perpendicular to a mounting surface PCB-MS (refer to FIG. 3) of the printed circuit board PCB.

According to one or more of the above-described exemplary embodiments, since the reflective member is integrated with the bottom cover, the display device has an overall slim profile in a thickness direction thereof. Since the reflective member allows the light leaked from an area adjacent to the light incident surface of the light guide plate to be re-incident to the light guide plate, optical efficiency within the display device increases.

Although exemplary embodiments of the invention have been described, it is understood that the invention should not be limited to these exemplary embodiments but various changes and modifications can be made by one ordinary skilled in the art within the spirit and scope of the invention as hereinafter claimed.

Hence, the real protective scope of the invention shall be determined by the technical scope of the accompanying claims.

What is claimed is:

1. A display device comprising:
   a display panel which displays an image with light;
   a backlight unit which is disposed below the display panel and generates and provides the light to the display panel, the backlight unit comprising:
      a light guide plate defining an emission surface thereof through which the light is emitted, and a light incident surface thereof through which the light is incident to the light guide plate, and
      a light source which generates and provides the light to the light incident surface of the light guide plate,
   a bottom cover which supports the display panel and accommodates the backlight unit, the bottom cover comprising:
      a bottom portion which supports the backlight unit, the bottom portion defining a plurality of edges thereof,
      a first sidewall which is bent at a first edge of the bottom portion, the first sidewall facing the light incident surface of the light guide plate, and
      a support portion which is bent from the first sidewall to cover the light incident surface of the light guide plate, the support portion extended to face the bottom portion and support the display panel thereon; and
   a reflective member coupled to the support portion of the bottom cover at the light incident surface of the light guide plate, the reflective member disposed in a same plane as the support portion to overlap the emission surface of the light guide plate and having a same thickness as the support portion.

2. The display device of claim 1, wherein the support portion of the bottom cover defines:
   a supporting surface thereof facing the display panel and supporting the display panel thereon,
   a facing surface opposing the supporting surface in a thickness direction of the support portion, and
   side surfaces which connect the supporting surface to the facing surface, and
   the reflective member is coupled to and extended from at least one of the side surfaces of the support portion.

3. The display device of claim 1, wherein
   the light source comprises: a printed circuit board and a plurality of light emitting elements which is mounted on the printed circuit board, and
   the plurality of light emitting elements is disposed between the first sidewall of the bottom cover and the light incident surface of the light guide plate.

4. The display device of claim 3, wherein
   the printed circuit board is disposed on the first sidewall of the bottom cover and defines a mounting surface thereof on which the plurality of light emitting elements is mounted, and
   emission surfaces of the plurality of light emitting elements are parallel to the mounting surface of the printed circuit board.

5. The display device of claim 3, wherein
   the printed circuit board is extended between the light guide plate and the bottom portion of the bottom cover and defines a mounting surface thereof on which the plurality of light emitting elements is mounted, and
   emission surfaces of the plurality of light emitting elements are perpendicular to the mounting surface of the printed circuit board.

6. A display device comprising:
   a display panel which displays an image with light;
   a backlight unit which is disposed below the display panel and generates and provides the light to the display panel, the backlight unit comprising:
      a light guide plate defining an emission surface thereof through which the light is emitted and a light incident surface thereof through which the light is incident to the light guide plate, and
      a light source which generates and provides the light to the light incident surface of the light guide plate,
   a bottom cover which supports the display panel and accommodates the backlight unit, the bottom cover comprising:
      a bottom portion which supports the backlight unit, the bottom portion defining a plurality of edges thereof,
      a first sidewall which is bent at a first edge of the bottom portion, the first sidewall facing the light incident surface of the light guide plate, and
      a support portion which is bent from the first sidewall to cover the light incident surface of the light guide plate, the support portion extended to face the bottom portion and support the display panel thereon; and
   a reflective member coupled to the support portion of the bottom cover at the light incident surface of the light guide plate, the reflective member partially overlapping the emission surface of the light guide plate and having a same thickness as the support portion,
   wherein
   the reflective member extends from the support portion of the bottom cover in a first direction, and
   the support portion of the bottom cover defines:
      first blocks thereof each of which has a first length in the first direction; and
      second blocks thereof each of which has a second length in the first direction that is less than the first length in the first direction,
      wherein the first blocks and the second blocks are alternately arranged in a second direction crossing the first direction.

7. The display device of claim 6, wherein the reflective member comprises:
   first reflective portions respectively corresponding to the first blocks of the support portion of the bottom cover and each of which has a third length, in the first direction; and
   second reflective portions respectively corresponding to the second blocks of the support portion of the bottom cover and each of which has a fourth length greater than the third length, in the first direction.

8. The display device of claim 7, wherein the sum of the first length and the third length is the same as that of the second length and the fourth length.

9. The display device of claim 7, wherein the plurality of light emitting elements respectively overlaps the second reflective portions.

10. A display device comprising:
    a display panel which displays an image with light;

a backlight unit which is disposed below the display panel and generates and provides the light to the display panel, the backlight unit comprising:
  a light guide plate defining an emission surface thereof through which the light is emitted and a light incident surface thereof through which the light is incident to the light guide plate, and
  a light source which generates and provides the light to the light incident surface of the light guide plate,
a bottom cover which supports the display panel and accommodates the backlight unit, the bottom cover comprising:
  a bottom portion which supports the backlight unit, the bottom portion defining a first edge, a second edge facing the first edge, and third and fourth edges respectively connecting the first and second edges to each other, the third and fourth edges facing each other,
  a first sidewall, a second sidewall, a third sidewall, and a fourth sidewall respectively bent from the first edge, the second edge, the third edge, and the fourth edge the first sidewall facing the light incident surface of the light guide plate, and
  a support portion which is bent from the first sidewall to cover the light incident surface of the light guide plate, the support portion extended to face the bottom portion and support the display panel thereon; and
a reflective member coupled to the support portion of the bottom cover at the light incident surface of the light guide plate, the reflective member partially overlapping the emission surface of the light guide plate and having a same thickness as the support portion,
wherein each of the second to fourth sidewalls of the bottom cover comprises a plurality of sub-sidewalls which is spaced apart from each other and each bent from a respective edge among the second to fourth edges of the bottom portion of the bottom cover.

11. The display device of claim 10, further comprising a mold frame which is coupled to the bottom cover and supports the display panel thereon, wherein
a plurality of openings respectively adjacent to the plurality of sub-sidewalls is defined in the bottom portion of the bottom cover, and
the mold frame comprises:
  first to third bodies respectively corresponding to the second to fourth sidewalls of the bottom cover, and
  a plurality of coupling protrusions which is respectively protruding from the first to third bodies and respectively extended into the plurality of openings in the bottom portion of the bottom cover to couple the first to third bodies to the bottom cover.

12. The display device of claim 11, wherein each of the first to third bodies respectively corresponding to the second to fourth sidewalls of the bottom cover comprises:
  an inner portion extended facing an inner surface of the corresponding sidewall among the second to fourth sidewalls and from which the coupling protrusions protrude,
  an outer portion extended facing an outer surface of the corresponding sidewall among the second to fourth sidewalls, and
  a connecting portion which connects the inner portion to the outer portion.

13. The display device of claim 11, wherein the first to third bodies of the mold frame define a stepped portion which overlaps the display panel and on which the display panel is supported.

14. The display device of claim 1, further comprising a reflective sheet disposed between the bottom portion of the bottom cover and the light guide plate.

15. The display device of claim 14, further comprising an optical sheet disposed between the display panel and the light guide plate.

16. The display device of claim 1, further comprising a top cover which is coupled to the bottom cover and in which is defined an opening which exposes a display area of the display panel.

* * * * *